United States Patent
Kim

(10) Patent No.: US 12,490,902 B2
(45) Date of Patent: Dec. 9, 2025

(54) DEVICE FOR ACQUIRING FUNCTIONAL IMAGE OF TISSUE AND METHOD FOR GENERATING SAME

(71) Applicant: LUTRONIC CORPORATION, Goyang-si (KR)

(72) Inventor: Bong Kyun Kim, Cheonan-si (KR)

(73) Assignee: R:GEN VISION, INC., Boston, MA (US)

( * ) Notice: Subject to any disclaimer, the term of this patent is extended or adjusted under 35 U.S.C. 154(b) by 494 days.

(21) Appl. No.: 17/797,861

(22) PCT Filed: Jan. 29, 2021

(86) PCT No.: PCT/KR2021/001195
§ 371 (c)(1),
(2) Date: Aug. 5, 2022

(87) PCT Pub. No.: WO2021/157962
PCT Pub. Date: Aug. 12, 2021

(65) Prior Publication Data
US 2023/0066464 A1     Mar. 2, 2023

(30) Foreign Application Priority Data

Feb. 6, 2020  (KR) ........................ 10-2020-0014269

(51) Int. Cl.
*A61B 5/00*     (2006.01)
(52) U.S. Cl.
CPC .......... *A61B 5/0066* (2013.01); *A61B 5/0037* (2013.01); *A61B 5/7203* (2013.01); *G06T 2207/30101* (2013.01)

(58) Field of Classification Search
CPC ... A61B 5/0066; A61B 5/0037; A61B 5/7203; G06T 2207/30101
USPC ......................................................... 382/130
See application file for complete search history.

(56) References Cited

U.S. PATENT DOCUMENTS 4,896,029 A     1/1990  Chandler

FOREIGN PATENT DOCUMENTS

| KR | 10-2013-0035311 A | 4/2013 | |
| KR | 10-1789441 B1 | 10/2017 | |
| KR | 1789441 B1 * | 10/2017 | |
| KR | 10-2018-0136661 A | 12/2018 | |
| KR | 10-2018-0136664 A | 12/2018 | |
| KR | 2018136661 A * | 12/2018 | |
| WO | WO-2020148567 A2 * | 7/2020 | ........... G01S 17/931 |

* cited by examiner

*Primary Examiner* — Wednel Cadeau

(57) ABSTRACT

The present invention discloses a device for acquiring a functional image of tissue and a method for acquiring a functional image by using same, the device comprising: a light source for irradiating a tissue to be imaged with coherent light; an image acquisition unit for acquiring an image of a speckle pattern which is formed by scattering the light emitted from the light source over the tissue, and acquiring multiple images having different exposure times; an image processing unit for generating a functional image of the tissue on the basis of the multiple images acquired by the image acquisition unit; and a control unit for adjusting the light quantity of the light emitted to the tissue such that the multiple images having different exposure times have brightness values in a common range, and controlling the operation of the image acquisition unit.

21 Claims, 7 Drawing Sheets ated Application No. PCT/KR2021/001195 filed on Jan. 29, 2021, which claims the priority benefit of Korean Patent Application No. 10-2020-0014269, filed on Feb. 6, 2020, in the Korean Intellectual Property Office, the disclosures of which are incorporated herein by reference.

DEVICE FOR ACQUIRING FUNCTIONAL IMAGE OF TISSUE AND METHOD FOR GENERATING SAME

CROSS REFERENCE TO RELATED APPLICATIONS

The present application is a National Phase of International Application No. PCT/KR2021/001195 filed on Jan. 29, 2021, which claims the priority benefit of Korean Patent Application No. 10-2020-0014269, filed on Feb. 6, 2020, in the Korean Intellectual Property Office, the disclosures of which are incorporated herein by reference.

TECHNICAL FIELD

The disclosure relates to a device for acquiring a functional image of tissue and a method of generating that, and more particularly to a device for acquiring a functional image of tissue based on a speckle pattern image of coherent light, and a method of generating that.

BACKGROUND ART

A functional image refers to medical imaging technology for detecting or measuring change or the like in metabolism, bloodstream, local chemical composition, etc. The functional image, the meaning of which contrasts with that of a structural image, is used in finding out the physiological activities of specific tissue or organs. Such a functional image may be acquired using a contrast medium or a tracer for a specific substance, but may also be acquired without injecting any separate substance by applying a speckle pattern-based image processing to a plurality of images obtained through a multi-exposure imaging technique.

However, the multi-exposure imaging technique for the speckle pattern has a disadvantage in that it is difficult to frequently perform calibration because a calibration process for minimizing errors due to deviations in brightness and noise level between the images obtained by the multiple shooting takes a lot of time even though this process is required to implement a quantitative and reliable functional image.

DISCLOSURE

Technical Problem

The disclosure is conceived to solve the foregoing disadvantage, an aspect of the disclosure is to provide a device for acquiring a functional image of tissue and a method of generating the same, in which the functional image is improved in accuracy, reliability and robustness even though time taken in calibration is minimized in acquiring the functional image.

Technical Solution

According to the foregoing aspect, a device for acquiring a functional image of tissue is provided including incoherent and coherent light sources configured to irradiate the tissue targeted to be scanned by contactless or contact; an image acquisition unit configured to acquire an image (or an image having a speckle pattern in the case of the coherent light source) formed as light emitted from the light source is scattered in the tissue, wherein a plurality of images different in exposure time from each other are acquired; an image processing unit configured to generate the functional image of the tissue based on the plurality of images acquired by the image acquisition unit; and a control unit configured to adjust the quantity of light emitted to the tissue and control operations of the image acquisition unit so that the plurality of images different in exposure time from each other can have brightness values within a common range, wherein the control unit measures variation in the brightness value of the image according to variation in the quantity of the light for each exposure time, and sets an appropriate light quantity value corresponding to each exposure time so that the plurality of images different in exposure time from each other can have the brightness values within the common range.

In this case, the control unit may perform control to acquire a plurality of sample images while intermittently adjusting the quantity of light for each exposure time, and measure variation in an image brightness value according to variation in light quantity for a specific exposure time based on the plurality of sample images. In addition, the device may further include a light quantity adjusting unit configured to adjust the quantity of light emitted from the light source to the tissue, wherein the control unit controls the light quantity adjusting unit to adjust the quantity of light emitted to the tissue.

Meanwhile, the control unit may performs steps of: acquiring a plurality of sample image while adjusting light quantity for each exposure time; deriving a correlation between the light quantity and a sample image brightness value for each exposure time by analyzing brightness values of the plurality of acquired sample images; and setting an appropriate light quantity value for each exposure time based on the derived correlation so that the plurality of images different in exposure time from each other can have brightness values within a common range.

In this case, the correlation may be derived by a linear regression analysis or a curve fitting analysis based on the light quantity and brightness value information of the plurality of sample images, or the correlation may be derived as a polynomial function of brightness values, in which the light quantity is used as a variable. Further, the plurality of sample images may be acquired at least 4 times and not more than 20 times for each exposure time.

Meanwhile, in terms of measuring variation in an image brightness value according to variation in light quantity for each exposure time, the number of sample images acquired in a relatively short exposure time may be greater than or equal to the number of sample images acquired in a relatively long exposure time. Further, variation in light quantity between sample images acquired in a relatively short exposure time may be larger than variation in light quantity between the sample images acquired in a relatively long exposure time. In addition, the control unit may first measure the variation for a relatively short exposure time rather than a relatively long exposure time.

Further, the control unit may measure variation in an image brightness value by acquiring a plurality of sample images while increasing light intensity step by step for each exposure time, and terminate the measurement of the variation in the image brightness value compared to the light quantity in the corresponding exposure time when the image brightness value exceeds a preset criterion.

In this case, the preset criterion may be set based on a preset brightness value, or based on a result of measuring the variation in the image brightness value according to the variation in the light quantity obtained in a previous exposure time.

According to the foregoing aspect, a method of generating a functional image of tissue by a plurality of images different in exposure time from each other is provided including the steps of: deriving a correlation between the quantity of light and an image brightness value for each exposure time, by measuring variation in the image brightness value according to variation in the quantity of light emitted to tissue for each exposure time; setting an appropriate light quantity value for each exposure time based on the derived correlation so that the plurality of images different in exposure time from each other can have brightness values within a common range; and acquiring the plurality of images different in exposure time from each other by emitting coherent light to the tissue, wherein the exposure time and the quantity of light emitted to the tissue are controlled to correspond to the set appropriate light quantity value for each exposure time; and generating the functional image of the tissue based on the plurality of acquired images.

In this case, the step of deriving the correlation may include: a sample image acquiring step of acquiring a plurality of sample images while intermittently adjusting the quantity of light for each exposure time; and an analyzing step of analyzing the plurality of acquired sample images to derive the correlation between the quantity of light and the image brightness value for each exposure time.

In this case, in the step of deriving the correlation, the number of sample images acquired in a relatively short exposure time may be greater than or equal to the number of sample images acquired in a relatively long exposure time. Further, variation in light quantity between sample images acquired in a relatively short exposure time may be larger than variation in light quantity between the sample images acquired in a relatively long exposure time. In addition, the correlation may be first measured for a relatively short exposure time rather than a relatively long exposure time.

Advantageous Effects

According to the disclosure, when a multi-exposure imaging technique is used in acquiring a functional image, quick and accurate calibration technology is provided to be applied to various fields, in which the functional image is used, such as diagnosis of various lesions, monitoring of surgical procedures, and monitoring of effects after treatment, thereby contributing to accurate diagnoses and procedures based on the functional image.

MODE FOR INVENTION

Hereinafter, a device for acquiring a functional image of tissue and a method of generating the same according to embodiments of the disclosure will be described in detail with reference to the accompanying drawings. The relationship in position between elements is described based on the drawings. For ease of description, the drawings may be simplified or exaggerated as necessary. However, the disclosure is not limited to these embodiments, and other various devices may be added, modified or omitted.

Hereinafter, the tissue includes tissue of various human organs such as human skin, eye tissue, and blood vessels, and may also include animal tissue other than human tissue. In addition, the functional image refers to an image that includes information about physiological activities such as metabolism or intrinsic characteristics of tissue, as well as structural information such as the shape and boundary of tissue. For example, the functional image may correspond to an image that includes various pieces of characteristic information or physiological information of various tissues, such as the bloodstream information of subcutaneous tissue, the bloodstream information of a fundus, the oxygen saturation information of the fundus, the elasticity information of skin tissue, and temperature information.

Further, hereinafter, a 'light quantity value' may refer to a quantitative value of light quantity, and may also refer to the meaning including a control value for controlling the light quantity having a functional relation with the light quantity value. Further, an 'image brightness value' may refer to the meaning including a value obtained by quantitatively quantifying the brightness of an image as defined by a user.

Figure 1:
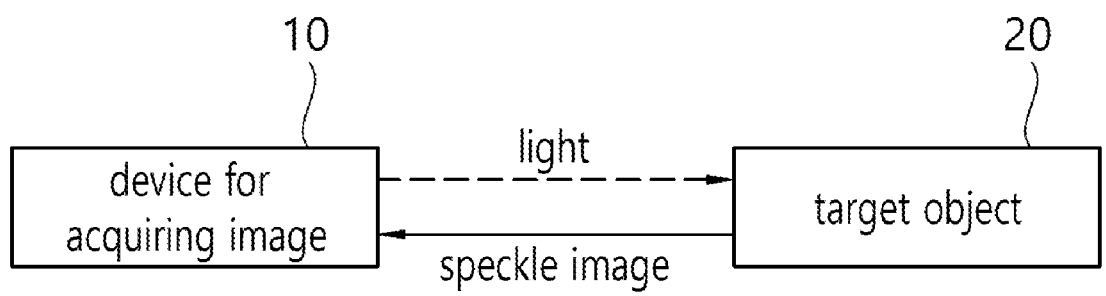
FIG. 1 is a block diagram showing a device for acquiring a functional image of tissue according to the disclosure and a target to be scanned.

FIG. 1 is a block diagram showing a device for acquiring a functional image of tissue according to the disclosure and a target to be scanned. In FIG. 1, a device 10 for acquiring an image refers to a device for acquiring an image by a multi-exposure speckle imaging method, in which the functional image of the tissue is acquired by speckle contrast imaging based on various exposure times.

A speckle image is generated by irregular interference of a laser beam or the like coherent light. When the coherent light is irradiated to an object to be scanned (e.g., tissue or a sample), the light travels in various paths while being scattered by various scattering particles inside the target object. Thus, a speckle pattern detected by a detection unit forms various light intensity patterns based on various interference phenomena of the scattered light. In this case, change in metabolism or the like causes the position and characteristics of the scattering particles to be changed, thereby leading to change in the speckle pattern. Therefore, the temporal and spatial statistics of such speckle patterns provide information about functional changes in the tissue and sample to be scanned, and thus the device for acquiring the image can generate the function image by measuring and analyzing this information.

The device 10 for acquiring the functional image needs a plurality of images to obtain correlation time information. Therefore, the device 10 for acquiring the functional image acquires a plurality of speckle pattern images different in exposure time from each other, and generates the functional image of the tissue based on the plurality of speckle pattern images. In this case, if the plurality of images has a constant brightness value and thus has a small noise deviation, it is possible to achieve a precise diagnosis and acquire a high-resolution functional image. Therefore, the device for acquiring the functional image according to the disclosure is configured to perform a calibration step before a main step for acquiring the functional image, so that the images different in exposure time can have corresponding brightness values.

Figure 2:
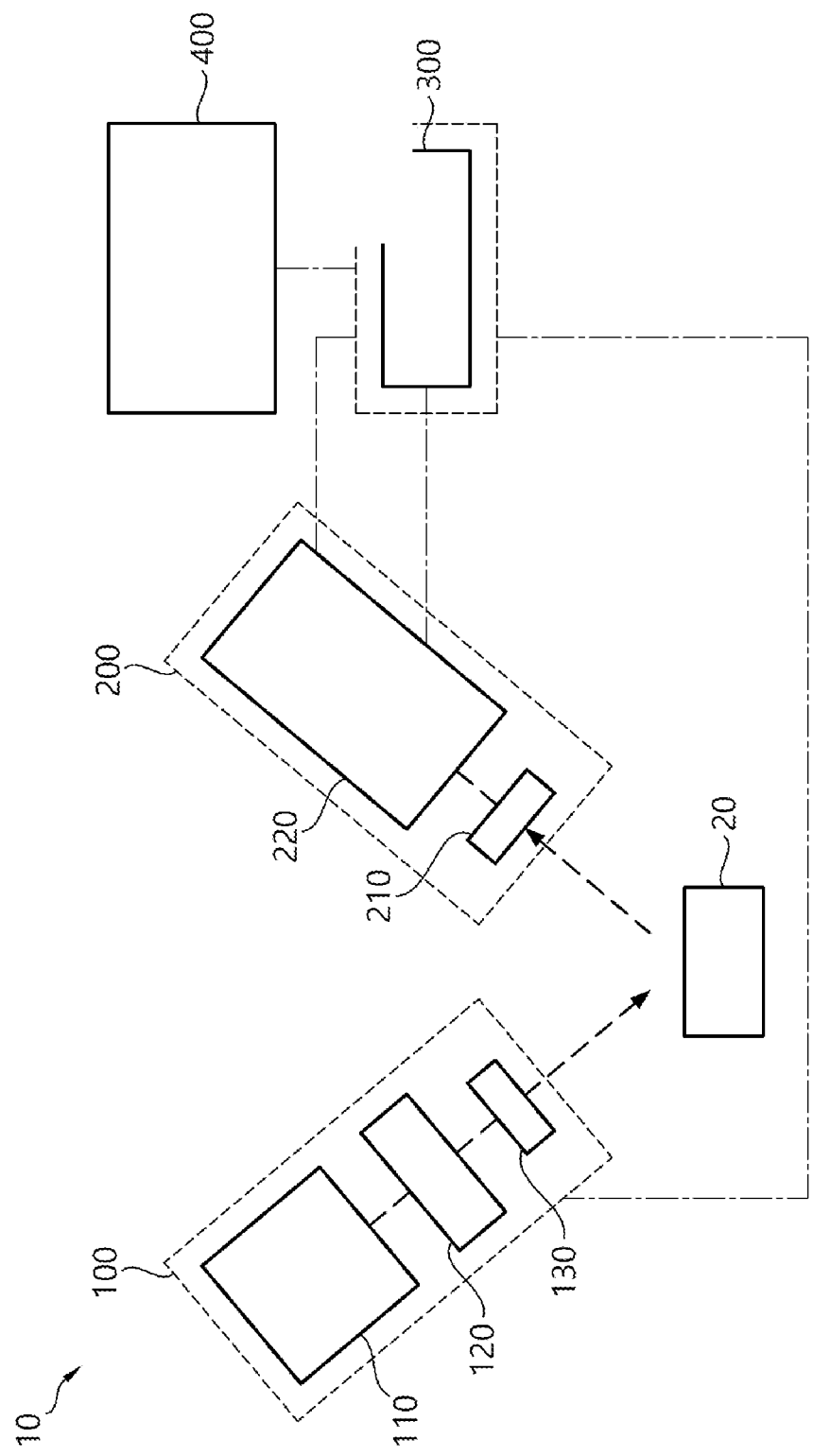
FIG. 2 is a block diagram showing main elements of the device for acquiring the functional image in FIG. 1.

FIG. 2 is a block diagram showing main elements of the device for acquiring the functional image in FIG. 1. Below, the device for acquiring the image according to an embodiment will be described in detail with reference to FIG. 2.

As shown in FIG. 2, the device 10 for acquiring the image includes a light irradiation unit 100, an image acquisition unit 200, a control unit 500, an image processing unit 300, and a display unit 400.

First, the light irradiation unit 100 is configured to irradiate a target object with light, and emits the light not only in a main step of acquiring the functional image but also in a process of acquiring a sample image in the foregoing calibration step. As shown in FIG. 2, the light irradiation unit 100 may include a light source 110, a light quantity adjusting unit 120, and a light diffusing unit 130.

The light source 110 is configured to generate light to be irradiated to the target object in the image acquiring step and the calibration step. The light generated in the light source 110 has coherent properties to form the speckle pattern as being scattered in the tissue. In this embodiment, the light source 110 includes a laser light source to generate a laser beam having a visible or near-infrared band wavelength. The laser beam may have central wavelengths around 632 nm, 780 nm, and 808 nm.

The light quantity adjusting unit 120 is configured to adjust the quantity of light generated in the light source 110 and irradiated to the target to be scanned. As shown in FIG. 2, the light quantity adjusting unit 120 is disposed between the light source 110 and the target object, and may adjust the quantity of light by a method of adjusting the transmittance of light. The light quantity adjusting unit 120 may include various devices for modulating the intensity of light passing therethrough, such as an acousto optic modulator (AOM), an electro optic modulator (EOM), a polarizer, and a current control device.

The light diffusing unit 130 includes optical elements disposed between the light source 110 and the target object. The light diffusing unit 130 diffuses the light emitted from the light source 110 so that the quantity of light can be spatially uniformly distributed, alternatively, the light could be delivered by using an optical fiber/optical waveguide or the like positioned between the light source and the target object.

Here, the target object refers to a target to be scanned, which is irradiated with light in the image acquiring step or the calibration step, and may appear on an image or a sample image. For example, the target object may include human tissue, for example, tissue of hand, foot or the like skin, or various body tissues or organs to be variously exposed onto an optical path like fundus. Alternatively, the target object may include a collected sample tissue, or a sample or phantom prepared for the calibration step.

Meanwhile, as shown in FIG. 2, the image acquisition unit 200 is configured to acquire an image by receiving light irradiated by the light irradiation unit 100 and reflected from the target object. As described above, the light irradiated by the light irradiation unit 100 forms the speckle pattern as being scattered by the target object, and the image acquisition unit 200 may acquire an image including such a speckle pattern. The image acquisition unit 200 includes at least one optical element 210 (for example, a lens) and an image detection unit 220. Further, an optical fiber/optical waveguide may be used between the target object and the image acquisition unit and acquire an image in a contact manner.

At least one optical element 210 is disposed in front of the image detection unit 220 (between the target object and the image detection unit), and condense or modulate the light reflected and scattered from the target object so that the light can be detected by the image detection unit 220. Thus, the speckle pattern based on the scattering from the target object may be detected as an image by the image detection unit 220 through the optical element 210.

The image detection unit 220 is configured as a sensor for receiving light and detecting an image. In this embodiment, the image detection unit 220 may be a sensor that has a high quantum efficiency with respect to the light having visible and near-infrared band wavelengths, and may include a charge-coupled device (CCD) sensor, a complementary metal-oxide semiconductor (CMOS) sensor, or the like imaging sensor.

As described above, the device 10 for acquiring a functional image according to the disclosure generates the functional image by a multi-exposure speckle imaging method, and therefore the image acquisition unit 200 in this embodiment is configured to acquire a plurality of images based on different exposure times under control of the control unit 500 (to be described later).

The plurality of images different in exposure time, which are acquired by the image acquisition unit, is transmitted to the image processing unit 300, and the image processing unit 300 generates the functional image based on the plurality of received images. The functional image includes functional information such as the characteristics or physiological activities of tissue as described above, and the functional information may be displayed being overlapped on a structural image of the object. The image processing unit 300 may be configured with a processor or the like computing element. In FIG. 2, that the image processing unit 300 is illustrated as a subordinate element of the control unit 500, but not limited thereto. Alternatively, that the image processing unit 300 may be provided as a separate element.

The functional image generated by the image processing unit 300 is displayed by the display unit 400, so that the functional information of the object can be delivered to a user.

Meanwhile, the control unit 500 is configured to control the operations of the elements of the device 10 for acquiring the image by transmitting control signals to the elements, collect and process various pieces of information detected from the elements, or transmit the collected or processed information to other elements. The control unit 500 may include a processor or the like operation processing device, a memory or the kike data storage device, etc. Therefore, the operations of the light irradiation unit 100, the image acquisition unit 200, and the display unit 400 in this embodiment may be controlled by the control unit 500. In this embodiment, the image processing unit 300 is provided as a subordinate element of the control unit. However, when the image processing unit is provided separately from the control unit, the control unit may control the image processing unit to generate an image and transmit the generated image to the display unit.

As described above, the device for acquiring the functional image in this embodiment generates the functional image based on the plurality of images different in exposure time from each other, and the control unit 500 may control the image acquisition unit 200 to variously adjust the exposure times of the acquired images. Specifically, the control unit 500 controls the operation time or operation timing of the image detection unit 220, thereby variously adjusting the exposure time of the acquired image. Alternatively, when the optical element of the image acquisition unit includes a shutter, the control unit 500 may control the operations of the shutter to variously adjust the exposure time of the acquired image.

Further, the control unit 500 may control the light irradiation unit 100 to adjust the quantity of light irradiated to the target object. The light quantity control may be achieved in various ways, but, in this embodiment, the quantity of light may be adjusted by controlling the light quantity adjusting unit 120 including the AOM. In this embodiment, the light quantity adjusting unit 120 is disposed to transmit the light emitted from the light source, and adjusted in the transmittance of light according to voltage applied to the light quantity adjusting unit 120. Therefore, the control unit 500 controls a voltage signal applied to the light quantity adjusting unit 120, thereby adjusting the quantity of light irradiated from the light source 110 to the target object. Alternatively, the control unit may control the output of the light source to adjust the quantity of light without separately including the light quantity adjusting unit.

Under such control of the control unit, the quantity of light irradiated by the light irradiation unit 100 may be controlled in connection with the exposure times of the images acquired by the image acquisition unit 200. As described above, when the plurality of images have the brightness values corresponding to each other, the noise deviation is minimized, and it is thus possible to acquire the functional image having a high resolution. Therefore, the control unit 500 controls the light quantity and the exposure time in connection with each other, so that the plurality of images can have the brightness values corresponding to each other even though the plurality of images are different in exposure time from each other.

To this end, the control unit 500 may perform the calibration step before performing the main image-acquiring step. The calibration step is carried out to obtain a light quantity value suitable for each exposure time so that the images can have the corresponding brightness values. The light quantity value suitable for each exposure time is varied depending on image acquiring conditions, target objects, device errors, etc. Therefore, the control unit 500 measures a correlation between a light quantity value and a brightness value with respect to each exposure time through the calibration step, and sets the light quantity value suitable for each exposure time based on the correlation so that each image can have a preset brightness value.

Figure 3:
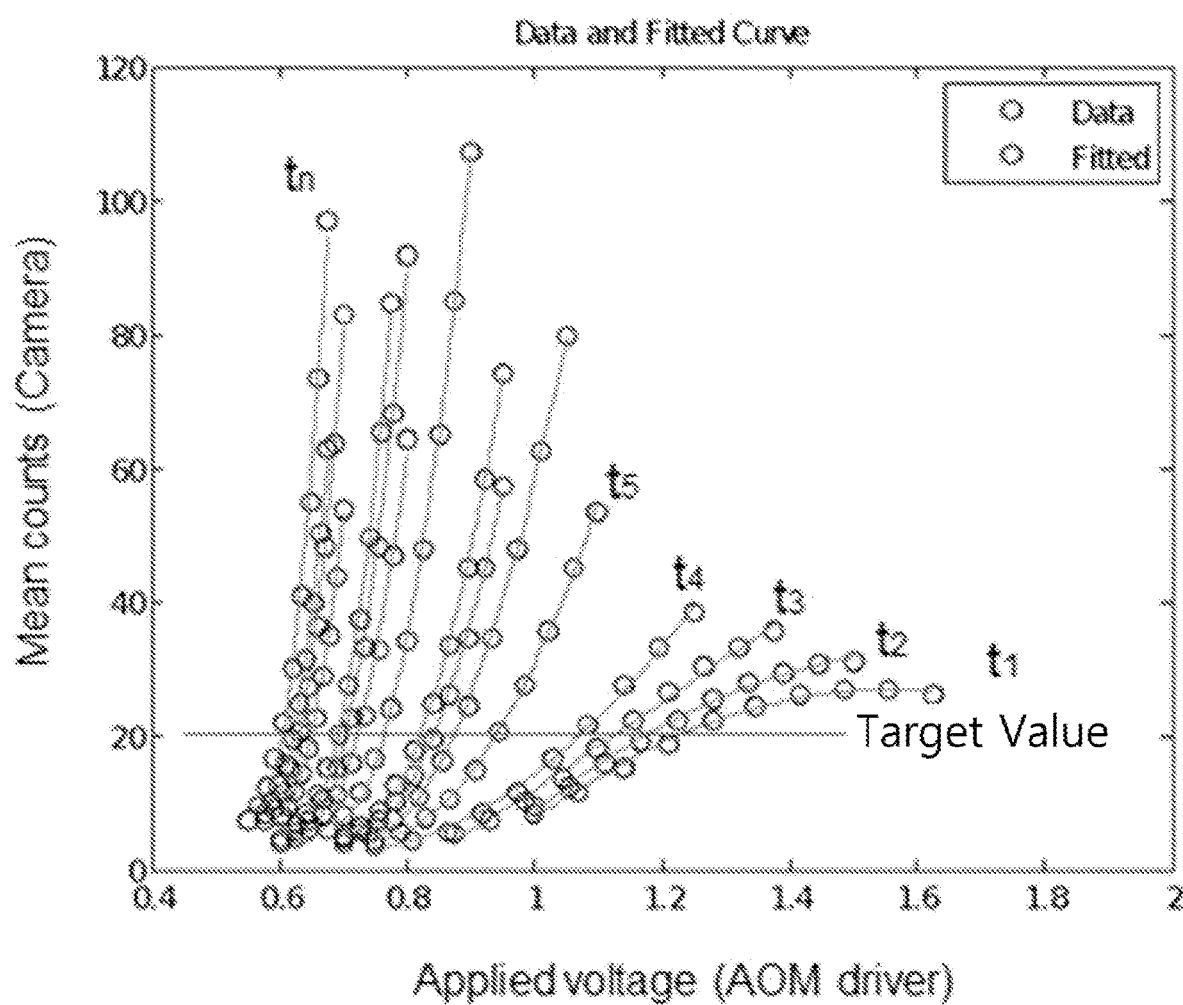
FIG. 3 is a graph showing results of measurement performed in a calibration step.

FIG. 3 is a graph showing results of measurement performed in the calibration step. Below, the calibration step performed in the device for acquiring the image according to an embodiment of the disclosure will be described in detail with reference to FIG. 3.

In the calibration step, the control unit 500 measures a sample a plurality of times for each exposure time. Here, the sample measured a plurality of times may be a plurality of sample images acquired while the light quantity value is varied step by step, and it is thus possible to measure variation in the brightness value of the image according to the variation of the light quantity value in the corresponding exposure time. Such measurements are performed with respect to n exposure times $t_1, t_2, \ldots, t_n$), and n exposure times may be all the settable exposure times or some of them.

For example, it will be described that the light quantity values and the brightness values of the sample images are measured in a certain exposure time $t_1$. First, the control unit 500 controls the light irradiation unit 100 and the image acquisition unit 200 to acquire a plurality of sample images in a state that the exposure time of the image acquisition unit is set to $t_1$. In this case, the plurality of acquired sample images are images acquired while the light quantity value increases step by step, and the sample images are acquired with different light quantity values. Thus, it is possible to measure the variation in the image brightness value according to the variation in the light quantity value.

In this case, the control unit 500 may control the light quantity adjusting unit 120 to adjust the light quantity value. Specifically, as shown in FIG. 3, according to an embodiment, a voltage applied to the light quantity adjusting unit is adjusted to change the diffraction characteristics of the AOM, thereby adjusting the light quantity (see the horizontal axis of FIG. 3). In addition, the brightness values of the sample images acquired under the conditions of the light quantity values are measured (see the vertical axis of FIG. 3). Here, the brightness value of the image or sample image may be an average value of signal intensity detected in the pixels of the image detection unit 220, but is not limited thereto. Alternatively, the brightness value may be based on an intermediate value of pixel detection signals, or may be defined in various other ways.

In this way, the control unit 500 controls the light irradiation unit 100 and the image acquisition unit 200 to measure the brightness value information of sample images based on the light quantity values in one exposure time. In addition, it is thus possible to derive a correlation between the light quantity value and brightness value in the corresponding exposure time. In this case, when the number of samples measured in one exposure time increases, the correlation is more precisely derived, but the time taken in acquiring a lot of sample data increases, thereby making it difficult to quickly carry out the calibration step. Accordingly, the sample images in this embodiment are acquired while the light quantity value is not plentifully and continuously but sparsely and intermittently varied in one exposure time (e.g., the exposure time $t_1$. The light quantity value may be varied non-uniformly, and the number of samples measured in one exposure time may be set within the minimum range where the correlation between the light quantity value and the image brightness value is approximately derived in the corresponding exposure time. For example, the number of sample images acquired in one exposure time may be 4 to 20, and, more particularly, may not exceed 15.

The control unit 500 measures the brightness value of the sample image according to the light quantity values by the foregoing method with respect to the exposure times $t_1$ to $t_n$. In this case, in terms of performing the measurement for each exposure time, the measurement for a relatively short exposure time may be performed prior to the measurement for a relatively long exposure time. In other words, the measurement for the exposure time $t_1$ is first performed, and then the measurements are performed in sequence of $t_2$, $t_3, \ldots$, up to $t_n$ (where, $t_1 < t_2 < \ldots < t_n$). In this case, the variations of the light quantity values for the respective exposure times may be different, and the light quantity variation for the relatively short exposure time (e.g., $t_i$) may be controlled to be greater than the light quantity variation for the relatively long exposure time (e.g., $t_j$, i<j) (see FIG. 3).

Figure 4:
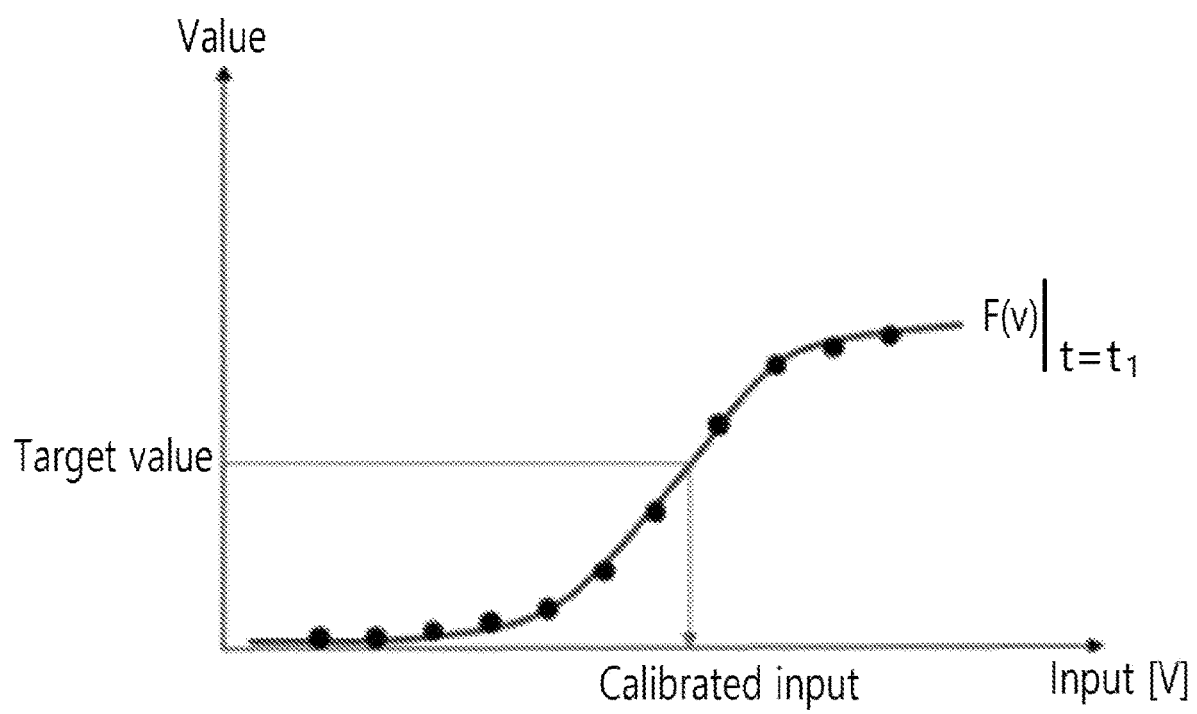
FIG. 4 is a graph showing a correlation between a light quantity value and an image brightness value based on sample information measured in one exposure time.

When the variation in the brightness value of the sample image is measured according to the variation in the light quantity in each exposure time, the control unit 500 drives the correlation between the light quantity value and the image brightness value for each exposure time based on the measured sample information. FIG. 4 is a graph showing a correlation between a light quantity value and an image brightness value based on sample information measured in one exposure time. The correlation may be derived by a linear regression analysis or a curve fitting analysis to the measured sample information, and the derived correlation may be observed in a linear graph as shown in FIG. 3 or 4 (see the solid line of FIG. 3). Alternatively, the foregoing correlation may be derived so that the image brightness value can have a polynomial function form using the light quantity value as a variable, and this function may be as follows.

$$y = c + \overline{1 + e^{b(x-x_0)}}$$

(where, y: image brightness value, x: light quantity value, and a, b, c and $x_0$: constants)

Therefore, the correlation may be derived by a method of obtaining the constants of the foregoing polynomial function. Besides this method, the correlation between the light quantity value and the image brightness value may be derived from the measured sample data by various data analysis methods.

When the correlation between the light quantity value and the image brightness value is derived in each exposure time, an appropriate light quantity value is obtained based on the correlation so that images acquired for each exposure time can have a brightness value in a common range. In this case, the brightness value in the common range may be set differently according to the kinds of functional images desired to be generated and the tissues. Alternatively, the brightness value in the common range may be obtained based on the maximum brightness value for a certain exposure time (for example, the brightness value corresponding to 90% of the highest brightness measured in the shortest exposure time $t_1$). The brightness value in the common range may be one target value as shown in FIG. 3, or may also be a range including some deviations from one target value.

Thus, the obtained appropriate light quantity value for each exposure time corresponds to a light quantity value at a point, in which a correlation curve for each exposure time intersects the line of the target value representing the common brightness value, in the graphs of FIGS. 3 and 4. Alternatively, the appropriate light quantity value may be obtained as a solution corresponding to the corresponding brightness value in the polynomial function representing the correlation. In this case, the appropriate light quantity value is not limited to the light quantity value intermittently controlled while the samples are measured in the calibration step, but, as shown in FIG. 4, an optimal value obtained based on the correlation may be set as the appropriate light quantity value (see the calibrated input of FIG. 4).

Meanwhile, FIG. 3 shows that the same number of samples are measured for each exposure time, and the correlation is derived based on the measured samples (the measurement of 10 samples for each exposure time in the graph of FIG. 3). However, the number of samples to be measured for each exposure time may be variously controlled without limitations.

For example, it will be assumed that the maximum brightness value is $Y_1$ when the samples are measured N times while increasing the light quantity value step by step in the exposure time $t_1$. In terms of measuring the samples in the subsequent exposure times $t_2$ to $t_n$, when the brightness value of the acquired sample image exceeds $Y_1$ before reaching N measurements, the measurements for the other samples may be omitted. The calibration step is needed for deriving the appropriate light quantity value to have the common brightness value, and therefore the sample information exceeding the maximum brightness value in the previous exposure times is highly likely to have a low weight in setting the appropriate light quantity value. Thus, when the plurality of samples are measured in a specific exposure time and their brightness values exceed the maximum brightness value of the previous exposure times, additional sample measurements may be terminated after measuring the minimum number of samples (e.g., four samples) necessary for deriving the correlation.

As another example, when the common brightness value (i.e., the target value in FIG. 3) is previously set, and the brightness values of the measured samples exceed the target value in terms of measuring the samples for each exposure time, the measurement of samples may be terminated without completing N measurements after measuring the minimum number of samples necessary for deriving the correlation.

As shown in the foregoing two examples described above, when a preset criterion is exceeded even when the same number of samples are not measured for each exposure time, additional sample measurements are terminated, thereby shortening the time taken in carrying out the calibration step.

When the appropriate light quantity value for each exposure time is set through the calibration step, the control unit 500 performs control to acquire the image for each exposure time based on the appropriate light quantity value set in the main image-acquiring step. Therefore, the plurality of images used in generating the functional image have the brightness values within a common range even though they are acquired in different exposure times, thereby making it possible to generate an accurate functional image having a high resolution.

Figure 5:
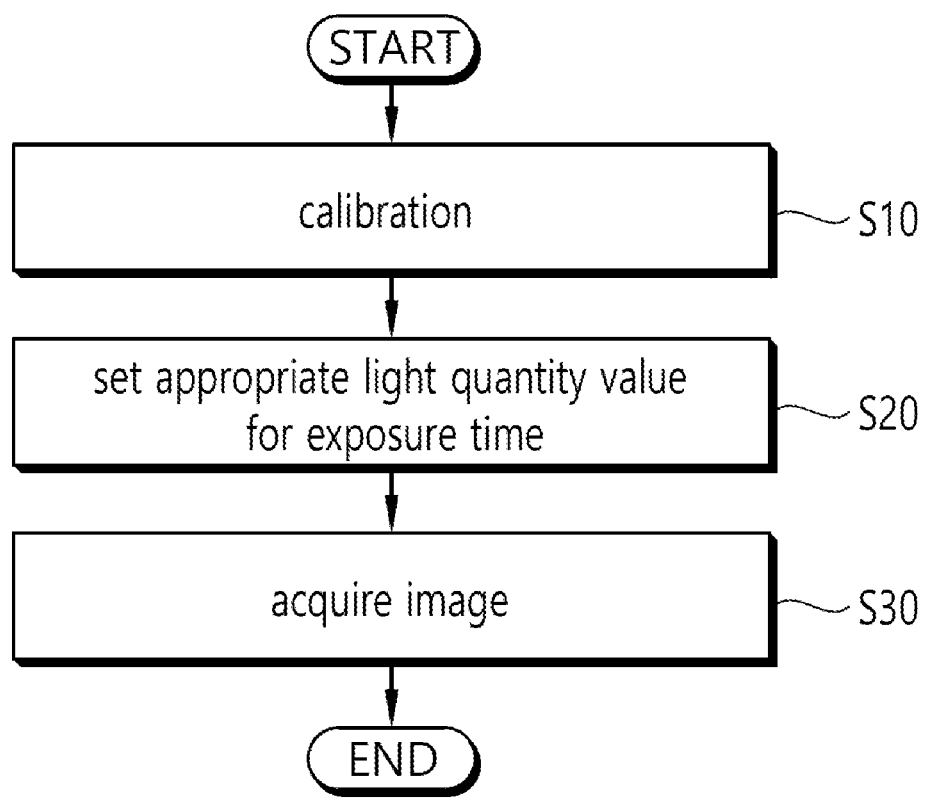
FIG. 5 is a flowchart showing a step of generating a functional image by the device for acquiring the functional image in FIG. 2.
Figure 6:
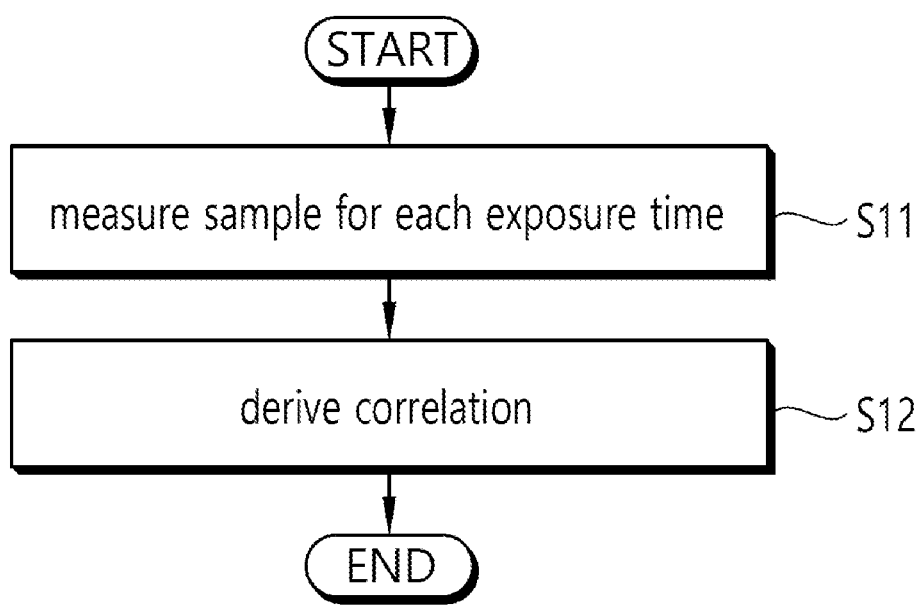
FIG. 6 is a flowchart showing the calibration step of FIG. 5.
Figure 7:
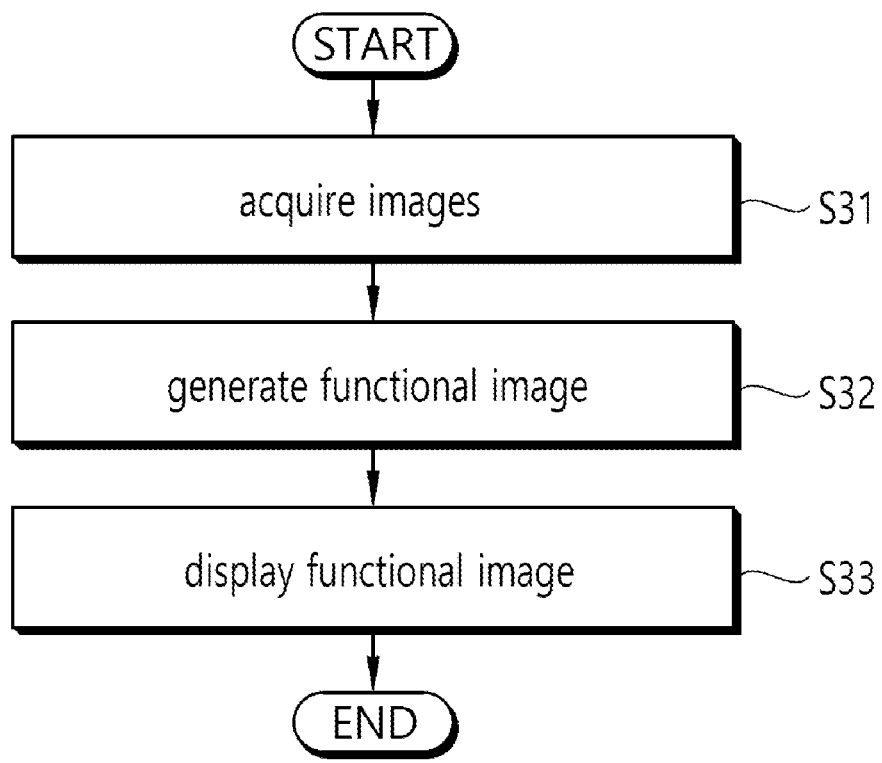
FIG. 7 is a flowchart showing a main image-acquiring step of FIG. 5.

Below, a method of generating a functional image by a device for acquiring the functional image according to an embodiment of the disclosure will be described in detail with reference to FIGS. 5 to 7. FIG. 5 is a flowchart showing a step of generating a functional image by the device for acquiring the functional image in FIG. 2, FIG. 6 is a flowchart showing the calibration step of FIG. 5, and FIG. 7 is a flowchart showing a main image-acquiring step of FIG. 5.

As shown in FIG. 5, the device for acquiring the image according to an embodiment performs the calibration step before performing the main image-acquiring step (S10). As shown in FIG. 6, the calibration step includes a step of measuring samples for each exposure time (S11), and a step of deriving a correlation between a light quantity value and an image brightness value for each exposure time (S12).

First, the step S11 of measuring the samples for each exposure time refers to a step of acquiring information about variation in the image brightness value according to variation in the light quantity value for each exposure time. Specifically, the control unit 500 controls the light irradiation unit 100 and the image acquisition unit 200 to acquire the sample image for each light quantity value while intermittently increasing the light quantity value in a state that the exposure time of the image acquisition unit 200 is set to a first exposure time $t_1$. Thus, it is possible to obtain information about the variation in the image brightness value according to the variation in the light quantity value in the first exposure time. When the sample measurement in the first exposure time is terminated, sample measurements in the second to nth exposure times $t_2$ to $t_n$ are performed in a similar way, thereby obtaining information about the variation in the image brightness value according to the variation in the light quantity value for each exposure time.

In this case, as described above, sample measurement for a short exposure time may be first performed. Further, in terms of measuring a plurality of samples for each exposure time, the control unit 500 may control the variation in the light quantity value between the samples to be relatively large in the short exposure time.

In addition, the control unit 500 may perform control to acquire N sample images by measuring the sample N times for each exposure time, but is not limited thereto. The control unit may acquire the sample images while increasing the light quantity value step by step for each exposure time, and terminate the sample measurement in the corresponding exposure time as long as a preset criterion is exceeded even before N measurements are not completed. In this case, as described above, the preset criterion may be set based on a preset brightness value or may be set based on measurement results in the previous exposure times (for example, when a sample is measured in an exposure time $t_i$, measurement termination is based on measurement results of previous exposure time $t_1$ to $t_{i-1}$). In this case, the sample measurement is not performed N times for every exposure time. In other words, the number of sample images $N_i$ acquired in a relatively short exposure time $t_i$ may be greater than or equal to the number of sample images $N_j$ acquired in a relatively long exposure time $t_j$ (for example, when $t_i < t_j$, $N_i \geq N_j$).

When the sample measurement for each exposure time is completed through the foregoing step, the control unit 500 derives the correlation between the light quantity value and the image brightness value for each exposure time based on the measured information (S12). As described above, in this step, the correlation may be derived by the linear regression analysis or the curve fitting analysis, or the correlation may be derived in the form of a preset polynomial function.

When the calibration step is performed by the foregoing step, a step of obtaining an appropriate light quantity value for each exposure time is performed (S20). In this step, the control unit 500 obtains the appropriate light quantity value for each exposure time based on the derived correlation and a preset common brightness value (see FIG. 4). In other words, the appropriate light quantity values for a total of n exposure times are obtained from an appropriate light quantity value $x_1$ for the first exposure time $t_1$ to an appropriate light quantity value $x_n$ for the first exposure time $t_n$. In this case, the obtained appropriate light quantity value may be different from the light quantity value of the sample measured in the calibration step.

Meanwhile, FIG. 5 shows this step as a separate step divided from the calibration step and the main image-acquiring step (to be described later), but this is merely an example and not construed as being limited thereto. For example, when the common brightness value is a fixed value, this step may be performed as a part of the calibration step. Alternatively, when the common brightness value is set differently according to the contents of the main image-acquiring step, this step may be performed as a part of the main image-acquiring step.

When the appropriate light quantity value for each exposure time is set through this step, the main image-acquiring step is performed based on the appropriate light quantity value (S30).

As shown in FIG. 7, the control unit 500 controls the light irradiation unit 100 and the image acquisition unit 200 to adjust the light quantity according to different exposure times, thereby acquiring the plurality of images (S31). In this case, the light quantity is controlled based on the appropriate light quantity values $x_1$ to $x_n$ for each set exposure times. The plurality of images acquired in this step have the brightness values within a common range even though they are acquired in different exposure times.

The plurality of images acquired in this step are transmitted from the image acquisition unit 200 to the image processing unit 300. Further, the image processing unit 300 processes the plurality of images to generate the functional image (S32), and shows a user the functional image through the display unit 400 (S33). In this case, the functional image generated by the image processing unit 300 and shown to a user is generated based on the images of which the noise deviations are minimized, thereby making it possible to display accurate functional information having a high resolution.

Although a device for acquiring the functional image according to the disclosure and a method of generating the functional image have been described above in detail, the descriptions are not construed as being limited to the foregoing embodiments. It will be appreciated that various modifications or changes can be made by a person having ordinary knowledge in the art without departing from the matters defined in the appended claims.

The invention claimed is:

1. A device for acquiring a functional image of tissue, the device comprising:
a light source configured to emit coherent light to the tissue targeted to be scanned;
an image acquisition unit configured to acquire an image having a speckle pattern formed as light emitted from the light source is scattered in the tissue, wherein a plurality of images different in exposure time from each other are acquired;
an image processing unit configured to generate the functional image of the tissue based on the plurality of images acquired by the image acquisition unit; and
a control unit configured to adjust quantity of light emitted to the tissue and control operations of the image acquisition unit so that the plurality of images different in exposure time from each other can have brightness values within a common range,
wherein the control unit is configured to acquire a plurality of sample images while adjusting the quantity of light for each exposure time, and derive a correlation function for each exposure time between the quantity of light emitted to the tissue and an image brightness value by analyzing brightness values of the plurality of acquired sample images for each exposure time, and
wherein the control unit is further configured to measure variation in the brightness value of the image according to variation in the quantity of light for each exposure time, terminate measuring the variation in the brightness value according to the quantity of light in a second exposure time after a first number of measurements sufficient to derive the correlation function for the second exposure time and before a second number of measurements at which a maximum brightness value has been measured in a first exposure time prior to the second exposure time, and set an appropriate light quantity value corresponding to each exposure time as a solution corresponding to a target brightness value to satisfy the correlation function for each exposure time.

2. The device of claim 1, wherein the control unit performs control to acquire the plurality of sample images while intermittently adjusting the quantity of light for each exposure time, and measures a plurality of brightness values according to a plurality of light quantity values for a specific exposure time based on the plurality of sample images.

3. The device of claim 1, further comprising a light quantity adjusting unit configured to adjust the quantity of light emitted from the light source to the tissue, wherein the control unit controls the light quantity adjusting unit to adjust the quantity of light emitted to the tissue.

4. The device of claim 1, wherein:
the correlation function is derived by a linear regression analysis or a curve fitting analysis based on the quantity of light and the brightness values of the plurality of sample images for each exposure time, or
the correlation function is derived as a polynomial function of the image brightness value, in which the quantity of light is used as a variable.

5. The device of claim 1, wherein the correlation function is be derived as a polynomial function of the image brightness value, in which a light quantity control value is used as a variable.

6. The device of claim 1, wherein the number of the plurality of sample images acquired for each exposure time is 4 to 20.

7. The device of claim 1, wherein the first exposure time is shorter than the second exposure time.

8. The device of claim 1, wherein the correlation function is defined as follows:

$$y = c + \frac{a}{1 + e^{b(x-x_0)}}$$

where y denotes the image brightness value, x denotes the quantity of light, and a, b, c, and xo are constants.

9. The device of claim 1, wherein the image acquisition unit includes an image detection unit configured to detect the scattered light from the tissue, and
wherein each of the brightness values of the plurality of acquired sample images is an average value of signal intensity detected by the image detection unit.

10. The device of claim 2, wherein, in terms of measuring the variation in the brightness value according to the quantity of light for each exposure time, the number of sample images acquired in a relatively short exposure time is greater than or equal to the number of sample images acquired in a relatively long exposure time.

11. The device of claim 2, wherein, in terms of measuring the variation in the brightness value according to the quantity of light for each exposure time, variation in the quantity of light between the sample images acquired in a relatively short exposure time is larger than variation in the quantity of light between the sample images acquired in a relatively long exposure time.

12. The device of claim 2, wherein, in terms of measuring the variation in the brightness value according to the quantity of light for each exposure time, the control unit first measures the variation for a relatively short exposure time rather than a relatively long exposure time.

13. The device of claim 2, wherein the control unit measures the variation in the brightness value by acquiring the plurality of sample images while increasing light intensity step by step for each exposure time.

14. The device of claim 9, further comprising a light quantity adjusting unit configured to adjust transmittance of the light emitted from the light source, the light quantity adjusting unit including an acousto-optic modulator (AOM) configured to change diffraction characteristics thereof according to a voltage applied to the light quantity adjusting unit.

15. A method of generating a functional image of tissue by a plurality of images different in exposure time from each other, the method comprising:
acquiring a plurality of sample images while adjusting quantity of light emitted to the tissue for each exposure time;
deriving a correlation function between the quantity of light emitted to the tissue and an image brightness value for each exposure time by analyzing brightness values of the plurality of acquired sample images for each exposure time;
setting an appropriate light quantity value for each exposure time based on the derived correlation function as a solution corresponding to a target brightness value to satisfy the correlation function for each exposure time, wherein the exposure time and the quantity of light emitted to the tissue are controlled to correspond to the set appropriate light quantity value for each exposure time; and
generating the functional image of the tissue based on the plurality of acquired sample images,
wherein measuring the variation in the brightness value according to the variation in the quantity of light in a second exposure time is terminated after a first number of measurements sufficient to derive the correlation function for the second exposure time and before a second number of measurements at which a maximum brightness value has been measured in a first exposure time prior to the second exposure time.

16. The method of claim 15, wherein the number of the sample images for each exposure time is 4 to 20.

17. The method of claim 15, wherein analyzing the plurality of acquired sample images includes using a linear regression or curve fitting analysis based on the quantity of light and brightness values of the plurality of sample images for each exposure time, or deriving a polynomial function of the image brightness value according to the quantity of light as a variable.

18. The method of claim 15, wherein, in deriving the correlation function, the number of sample images acquired in a relatively short exposure time is greater than or equal to the number of sample images acquired in a relatively long exposure time.

19. The method of claim 15, wherein in deriving the correlation function, variation in the quantity of light between the sample images acquired in a relatively short exposure time is larger than variation in the quantity of light between the sample images acquired in a relatively long exposure time.

20. The method of claim 15, wherein, in deriving the correlation function, the correlation function is first derived for a relatively short exposure time rather than a relatively long exposure time.

21. The method of claim 15, wherein, in deriving the correlation function, variation in the image brightness value is measured by acquiring the plurality of sample images while increasing light intensity step by step for each exposure time.

* * * * *